United States Patent
O'Malley

(10) Patent No.: US 10,256,491 B2
(45) Date of Patent: Apr. 9, 2019

(54) MEMBRANE ELECTRODE ASSEMBLY

(71) Applicant: Johnson Matthey Fuel Cells Limited, London (GB)

(72) Inventor: Rachel Louise O'Malley, Reading (GB)

(73) Assignee: Johnson Matthey Fuel Cells Limited, London (GB)

( * ) Notice: Subject to any disclaimer, the term of this patent is extended or adjusted under 35 U.S.C. 154(b) by 157 days.

(21) Appl. No.: 15/309,942

(22) PCT Filed: May 20, 2015

(86) PCT No.: PCT/GB2015/051479
§ 371 (c)(1),
(2) Date: Nov. 9, 2016

(87) PCT Pub. No.: WO2015/177542
PCT Pub. Date: Nov. 26, 2015

(65) Prior Publication Data
US 2017/0155163 A1    Jun. 1, 2017

(30) Foreign Application Priority Data

May 20, 2014    (GB) .................... 1408953.6

(51) Int. Cl.
*H01M 8/10* (2016.01)
*H01M 8/1004* (2016.01)
*H01M 4/92* (2006.01)

(52) U.S. Cl.
CPC ........... *H01M 8/1004* (2013.01); *H01M 4/92* (2013.01); *H01M 4/926* (2013.01)

(58) Field of Classification Search
CPC ....... H01M 8/1004; H01M 4/92; H01M 4/926
See application file for complete search history.

(56) References Cited

U.S. PATENT DOCUMENTS 4,289,591 A * 9/1981 Davidson .................. C25B 1/10
                                                      204/282
RE37,307 E    8/2001 Bahar et al.
(Continued)

FOREIGN PATENT DOCUMENTS

EP    0631337 A2    12/1994
WO    0024074      4/2000
(Continued)

OTHER PUBLICATIONS

Ball, S.C., "An investigation into factors affecting the stability of carbons and carbon supported platinum and platinum/cobalt alloy catalysts during 1.2V potentiostatic hold regimes at a range of temperatures," Journal of Power Sources 171 (2007) 18-25.
(Continued)

*Primary Examiner* — Jane J Rhee
(74) *Attorney, Agent, or Firm* — BakerHostetler

(57) ABSTRACT

The invention includes a catalysed membrane and membrane electrode assembly. The membrane and membrane electrode assembly comprise an ion-conducting membrane component comprising an ion-conducting membrane, an anode catalyst layer, and a cathode catalyst layer. The anode catalyst layer comprises a first electrocatalyst component comprising a first platinum-containing electrocatalyst and a first carbon support. The first carbon support supports the first platinum-containing electrocatalyst, and the electrochemical platinum surface area in the anode catalyst layer is 5-100 $cm^2Pt/cm^2$ of the geometric electrode area of the anode catalyst layer. The cathode catalyst layer comprises a second electrocatalyst component and a second oxygen evolution reaction electrocatalyst. The second electrocatalyst component comprises a second platinum-containing electrocatalyst and a second carbon support, wherein the
(Continued)

second carbon support supports the second platinum-containing electrocatalyst component.

9 Claims, 1 Drawing Sheet

(56) References Cited

U.S. PATENT DOCUMENTS

| | | |
|---|---|---|
| 7,087,063 B2 | 8/2006 | Carson et al. |
| 7,867,669 B2 | 1/2011 | Liu et al. |
| 2004/0126644 A1* | 7/2004 | Bett .................... H01M 4/8605 429/490 |
| 2008/0166599 A1 | 7/2008 | Swathirajan et al. |
| 2013/0022890 A1* | 1/2013 | Kundu ................ H01M 4/8828 429/480 |

FOREIGN PATENT DOCUMENTS

| | | | |
|---|---|---|---|
| WO | WO-0024074 A1 * | 4/2000 | ......... H01M 8/0289 |
| WO | 2005020356 A1 | 3/2005 | |
| WO | 2011021034 A1 | 2/2011 | |
| WO | 2012080726 A1 | 6/2012 | |
| WO | 2013045894 A1 | 4/2013 | |

OTHER PUBLICATIONS

Brightman, E., "In situ measurement of active catalyst surface area in fuel cell stacks," Journal of Power Sources 242 (2013) 244-254.
Catalysis—Science and Technology, Eds J. R. Anderson and M. Boudart, vol. 6, p. 257.
Gasteiger, Hubert A., "Activity benchmarks and requirements for Pt, Pt-alloy, and non-Pt oxygen reduction catalysts for PEMFCs," Applied Catalysis B: Environmental 56 (2005) 9-35.
Sethuraman, Vijay A., "Importance of catalyst stability vis-a-vis hydrogen peroxide formation rates in PEM fuel cell electrodes," Electrochimica Acta 54 (2009) 5571-5582.

* cited by examiner

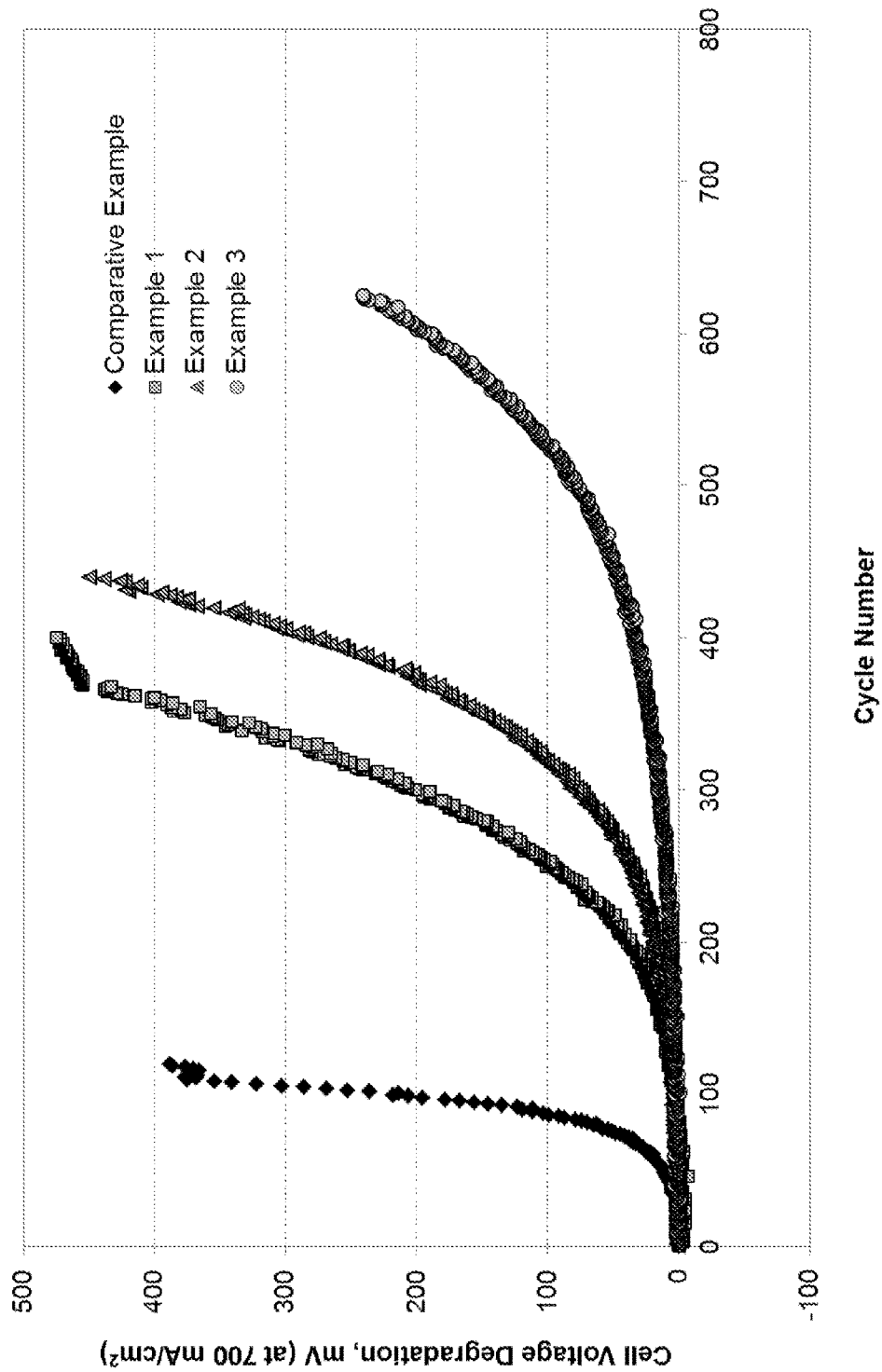

MEMBRANE ELECTRODE ASSEMBLY

FIELD OF THE INVENTION

The present invention relates to a catalysed membrane and a membrane electrode assembly for use in a fuel cell and in particular to a catalysed membrane and a membrane electrode assembly that is tolerant to performance degradation caused by repeated incidences of start-up/shut-down situations.

BACKGROUND OF THE INVENTION

A fuel cell is an electrochemical cell comprising two electrodes separated by an electrolyte. A fuel, such as hydrogen or an alcohol, such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In the hydrogen-fueled or alcohol-fueled proton exchange membrane fuel cells (PEMFC), the electrolyte is a solid polymeric membrane, which is electronically insulating and proton conducting. Protons, produced at the anode, are transported across the membrane to the cathode, where they combine with oxygen to form water. The most widely used alcohol fuel is methanol, and this variant of the PEMFC is often referred to as a direct methanol fuel cell (DMFC).

The principal component of the PEMFC is known as a membrane electrode assembly (MEA) and is essentially composed of five layers. The central layer is the polymeric ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

The electrocatalyst layers are generally composed of a metal, (such as a platinum group metal (platinum, palladium, rhodium, ruthenium, iridium and osmium), gold or silver, or a base metal) either unsupported in the form of a finely dispersed metal powder (a metal black) or supported on an electrically conducting support, such as a high surface area carbon material. Suitable carbons typically include those from the carbon black family, such as oil furnace blacks, extra-conductive blacks, acetylene blacks and graphitised versions thereof. Exemplary carbons include Akzo Nobel Ketjen EC300J and Cabot Vulcan XC72R. The electrocatalyst layers suitably comprise other components, such as ion-conducting polymer, which is included to improve the ionic conductivity within the layer. The electrocatalyst layers also comprise a certain volume fraction of porosity, which allows reactant ingress and product egress.

Conventionally, the MEA can be constructed by a number of methods outlined hereinafter:

(i) The electrocatalyst layer may be applied to the gas diffusion layer to form a gas diffusion electrode. Two gas diffusion electrodes can be placed either side of an ion-conducting membrane and laminated together to form the five-layer MEA;

(ii) The electrocatalyst layer may be applied to both faces of the ion-conducting membrane to form a catalysed ion-conducting membrane, either by direct application or indirectly by transfer from a previously coated decal transfer sheet. Subsequently, gas diffusion layers are applied to both faces of the catalysed ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs; removing products; providing electrical connections; and providing physical support.

SUMMARY OF THE INVENTION

High electrochemical potentials can occur in a number of real-life operational situations and in these circumstances can cause irreversible damage to the catalyst layer/electrode structure, due to corrosion of any carbon present in the layer (such as the support material for the catalyst) and loss of active surface area of the nanoparticulate electrocatalyst metal due to various metal sintering degradation mechanism that occur during high potential excursions. Such situations are well documented, but include:

(i) Cell reversal: fuel cells occasionally are subjected to a voltage reversal (cell is forced to the opposite polarity) often caused by a temporary depletion of fuel supply to the anode. This then leads to temporary undesirable electrochemical reactions taking place in order to maintain generation of an electrical current, such as carbon electro-oxidation at the anode which occurs at a higher potential than the oxygen reduction reaction at the cathode. In such a cell reversal situation, the anode structure can be irreversibly damaged, even for very short durations of reversal, due to oxidation of the carbon and thus permanent degradation of the anode catalyst layer structure.

(ii) Start-up/shut-down: when a fuel cell has been idle for some time it is quite possible for oxygen from the air to diffuse through the membrane from the cathode side and to displace any residual hydrogen still present in the anode side. When the cell is re-started and hydrogen is re-introduced into the anode, a mixed hydrogen/air composition will exist in the anode for a short period as a front that moves through the cell until the air is purged completely from the anode. The presence of a front that is hydrogen-rich on the inlet side and air-rich on the outlet side can set up an internal electrochemical cell within the fuel cell, such that carbon electro-oxidation is forced to occur at elevated potentials on the cathode side. In such a start-up situation, the cathode structure can be irreversibly damaged, due to oxidation of the carbon and thus permanent degradation of the cathode catalyst layer structure. A similar damaging electrochemical cell may also be set up on shut-down. Although it may be possible to limit these processes from occurring by, for example, purging of the anode gas space with an inert gas such as nitrogen during shut-down, it is clearly not a practical or economically viable proposition to carry such an additional gas on-board a fuel cell powered vehicle.

Solutions proposed to address the problems associated with incidences of high electrochemical potentials include employing an electrocatalyst support that is more resistant to oxidative corrosion than conventional electrocatalyst supports and incorporating an additional electrocatalyst composition that has activity for an alternative oxidation reaction that could take place at the high electrochemical potentials in preference to the damaging carbon electro-oxidation reactions, such as the oxygen evolution reaction (electrolysis of water). These mitigation measures often lead to a lowering of the overall fuel cell performance due to compromises made in the properties of the electrocatalyst layers.

Intermittent operation above the normal operating temperatures of 80° C. is likely for automotive PEMFC systems; however increasing temperature also promotes the carbon corrosion process and is therefore likely to accelerate any of the decay mechanisms described.

It is the object of the present invention to provide a catalysed membrane and a membrane electrode assembly which delivers improved tolerance to degradation caused by the start-up/shut-down mechanism, and suitably without compromising performance. The present inventors have realized a catalysed membrane and a membrane electrode assembly comprising a specific anode electrocatalyst layer which surprisingly provides for reduced oxidative corrosion of the cathode carbon support in real-life operational situations and thus provides a more durable, longer lifetime, catalysed membrane or membrane electrode assembly.

The catalysed membrane of the invention comprises:
(i) an ion-conducting membrane component having a first face and a second face, wherein the ion-conducting membrane component comprises an ion-conducting membrane;
(ii) an anode catalyst layer on the first face of the ion-conducting membrane component, wherein the anode catalyst layer comprises:
  (a) a first electrocatalyst component comprising a first platinum-containing electrocatalyst and a first carbon support, wherein the first carbon support supports the first platinum-containing electrocatalyst;
  and wherein the electrochemical platinum surface area in the anode catalyst layer is 5-100 $cm^2Pt/cm^2$ of the geometric electrode area of the anode catalyst layer;
(iii) a cathode catalyst layer on the second face of the ion-conducting membrane component, wherein the cathode catalyst layer comprises:
  (a) a second electrocatalyst component comprising a second platinum-containing electrocatalyst and a second carbon support, wherein the second carbon support supports the second platinum-containing electrocatalyst component.

The membrane electrode assembly of the invention comprises:
(i) an ion-conducting membrane component having a first face and a second face, wherein the ion-conducting membrane component comprises an ion-conducting membrane;
(ii) an anode catalyst layer on the first face of the ion-conducting membrane component, wherein the anode catalyst layer comprises:
  (a) a first electrocatalyst component comprising a first platinum-containing electrocatalyst and a first carbon support, wherein the first carbon support supports the first platinum-containing electrocatalyst;
  and wherein the electrochemical platinum surface area in the anode catalyst layer is 5-100 $cm^2Pt/cm^2$ of the geometric electrode area of the anode catalyst layer;
(iii) a cathode catalyst layer on the second face of the ion-conducting membrane component, wherein the cathode catalyst layer comprises:
  (a) a second electrocatalyst component comprising a second platinum-containing electrocatalyst and a second carbon support, wherein the second carbon support supports the second platinum-containing electrocatalyst component;
(iv) an anode gas diffusion layer on a face of the anode catalyst aye not in contact with the first face of the ion-conducting membrane; and
(v) a cathode gas diffusion layer on a face of the cathode catalyst layer not in contact with the second face of the ion-conducting membrane.

BRIEF DESCRIPTION OF THE DRAWINGS

FIG. 1 shows the fuel cell voltage degradation as a function of repeated start-up/shut down cycles.

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The present invention provides a catalysed membrane comprising:
(i) an ion-conducting membrane component having a first face and a second face, wherein the ion-conducting membrane component comprises an ion-conducting membrane;
(ii) an anode catalyst layer on the first face of the ion-conducting membrane component, wherein the anode catalyst layer comprises:
  (a) a first electrocatalyst component comprising a first platinum-containing electrocatalyst and a first carbon support, wherein the first carbon support supports the first platinum-containing electrocatalyst;
  and wherein the electrochemical platinum surface area in the anode catalyst layer is 5-100 $cm^2Pt/cm^2$ of the geometric electrode area of the anode catalyst layer;
(iii) a cathode catalyst layer on the second face of the ion-conducting membrane component, wherein the cathode catalyst layer comprises:
  (a) a second electrocatalyst component comprising a second platinum-containing electrocatalyst and a second carbon support, wherein the second carbon support supports the second platinum-containing electrocatalyst component.

The anode catalyst layer optionally comprises a first oxygen evolution reaction electrocatalyst.

The cathode catalyst layer optionally comprises a second oxygen evolution reaction electrocatalyst.

The anode catalyst layer optionally comprises a first hydrogen peroxide decomposition catalyst.

The cathode catalyst layer optionally comprises a second hydrogen peroxide decomposition catalyst The ion-conducting membrane component optionally comprises a third hydrogen peroxide decomposition catalyst.

The ion-conducting membrane component optionally comprises a hydrogen/oxygen recombination catalyst.

Anode Catalyst Layer

The anode catalyst layer is present on a first face of the ion-conducting membrane component.

The anode catalyst layer comprises a first electrocatalyst component comprising a first platinum-containing electrocatalyst. The first platinum-containing electrocatalyst comprises platinum.

In one aspect of the invention, the first platinum-containing electrocatalyst consists of platinum.

In a second aspect, the platinum is alloyed or mixed with one or more other platinum group metals (ruthenium, rhodium, palladium, osmium or iridium), gold, silver or a base metal or an oxide of one or more other platinum group metals, gold, silver or a base metal. The platinum is optionally alloyed or mixed with one or more of osmium, ruthenium, niobium, tantalum, vanadium, iridium, tin, titanium or rhodium.

The first platinum-containing electrocatalyst is supported on a first carbon support. The first carbon support may be a particulate or fibrous material, such as one or more carbonaceous materials selected from the group consisting of graphite, nanofibres, nanotubes, nanographene platelets, high surface area carbon blacks (such as Akzo Nobel Ketjen EC300J), low surface area carbon blacks (such as acetylene black), heat-treated or graphitised (above 2000° C.) carbon blacks or other highly graphitic carbon supports.

In one aspect, the first carbon support shows high resistance to corrosion at high potentials. By this is meant that the first carbon support material loses 15% or less of its mass in an accelerated test involving a 1.2V potential hold over a 24 hour period at 80° C. The loss of carbon can be determined by the following commonly accepted test used by those skilled in the art and as described in more detail in Journal of Power Sources, 171(1) 19 Sep. 2007, pages 18-25: an electrode of the chosen catalyst or carbon is held at 1.2 V in 1M $H_2SO_4$ liquid electrolyte vs. Reversible Hydrogen Electrode (RHE) and 80° C. and the corrosion current monitored over 24 hours. The charge passed during the experiment is then integrated and used to calculated the carbon removed, assuming a 4 electron process converting carbon to $CO_2$ gas; the first 1 minute of the test is not included as the charge passed during this time is attributed to the charging of the electrochemical double layer and therefore not due to corrosion processes. The mass of carbon lost during the 24 hour test is then expressed as a percentage of the initial carbon content of the electrode. The first carbon support suitably has a specific surface area (BET) of less than 200 $m^2/g$, suitably less than 150 $m^2/g$ and preferably less than 100 $m^2/g$. Determination of the specific surface area by the BET method is well documented; for example details can be found in 'Analytical Methods in Fine Particle Technology', by Paul A. Webb and Clyde Orr, Micromeritics Instruments Corporation 1997. This type of carbon support is of particular benefit if the anode catalyst layer comprises a first oxygen evolution reaction electrocatalyst.

Nanoparticles of the first platinum-containing electrocatalyst are supported on the first carbon support in an amount of from 10-75 wt %, based on the total weight of the first electrocatalyst component (first platinum-containing electrocatalyst and first carbon support). The actual amount will be dependent on the nature of the first carbon support.

The electrochemical platinum surface area (EPSA) is the platinum surface area ($cm^2$) per geometric electrode area ($cm^2$). The EPSA in the anode catalyst layer is 5-100 $cm^2Pt/cm^2$ of the anode catalyst layer.

Suitably, the EPSA has an upper limit of 80 $cm^2Pt/cm^2$ and preferably of 75 $cm^2Pt/cm^2$.

Suitably the EPSA has a lower limit of 10 $cm^2Pt/cm^2$ and preferably 15 $cm^2Pt/cm^2$.

The EPSA is dependent on the combination of the metal surface area of platinum in the first electrocatalyst component ($cm^2Pt/gPt$) and the loading of the first electrocatalyst component per geometric area in the anode catalyst layer ($gPt/cm^2$ anode catalyst layer) and is measured on MEAs incorporating the catalysed membrane of the invention using a cyclic voltammetry protocol with carbon monoxide (CO) stripping. The measurement is made at the normal operating conditions of the MEA in the fuel cell. Further details are available in J. Power Sources, 242 (2013), 244-255.

The metal surface area of platinum in the first electrocatalyst component is in the range of from 25 to 115 $m^2/gPt$. The metal surface area is determined using gas phase adsorption of carbon monoxide. The electrocatalyst is reduced in hydrogen, then titrating aliquots of carbon monoxide gas until there is no more uptake. The moles of carbon monoxide adsorbed can then be converted into a metal surface area, by assuming $1.25 \times 10^{19}$ atoms/$m^2$ for Pt as defined in 'Catalysis—Science and Technology, Vol. 6, p257, Eds J. R. Anderson and M. Boudart. The metal surface area determined using this method is well known to translate to the electrochemical surface area under fuel cell testing conditions.

The loading of the first electrocatalyst component in the anode catalyst layer is in the range of from 0.02 to 0.3 $mgPt/cm^2$, suitably from 0.02 to 0.2 $mgPt/cm^2$, preferably 0.02 to 0.15 $mgPt/cm^2$.

It will be apparent to the skilled person that the metal surface area of platinum in the first electrocatalyst component and the loading of the first electrocatalyst component in the anode catalyst layer are selected so as to provide an EPSA in the anode catalyst layer of 5-100 $cm^2Pt/cm^2$ of the anode catalyst layer, The anode catalyst layer may optionally comprise a first oxygen evolution reaction electrocatalyst as described in more detail hereinafter.

Suitably, the ratio (by weight) of the first oxygen evolution electrocatalyst to first electrocatalyst component (first platinum-containing electrocatalyst+first carbon support) in the anode catalyst layer is from 20:0.5 to 1:20, preferably from 1:0.5 to 1:10.

The anode catalyst layer suitably comprises an ion-conducting polymer, suitably a proton-conducting polymer. The proton-conducting polymer is any polymer that is capable of conducting protons. Examples of such polymers include dispersions of polymers based on perfluorosulphonic acid (PFSA) polymers (such as those sold under the trade names Nafion® (E.I. DuPont de Nemours and Co.), Aquivion® (Solvay Plastics), Aciplex® (Asahi Kasei) and Flemion® (Asahi Glass KK). Such PFSA based ion-conducting polymers are formed from the copolymerization of tetrafluoroethylene and a perfluorinated sulphonic acid derivative.

As an alternative to PFSA ion-conducting polymers it is possible to use dispersions of ion-conducting polymers based on sulfonated or phosphonated hydrocarbon polymers, such as the polyaromatic class of polymers.

The anode catalyst layer optionally comprises a first hydrogen peroxide decomposition catalyst as described in more details hereinafter.

The anode catalyst layer may comprise additional components. Such components include, but are not limited to: a hydrophobic (a polymer such as PTFE or an inorganic solid with or without surface treatment) or a hydrophilic (a polymer or an inorganic solid, such as an oxide) additive to control water transport.

To prepare the anode catalyst layer the first electrocatalyst component, first oxygen evolution reaction electrocatalyst, optional first hydrogen peroxide decomposition catalyst and any additional components, are dispersed in an aqueous and/or organic solvent, to prepare a catalyst ink. If required, particle break-up is carried out by methods known in the art, such as high shear mixing, milling, ball milling, passing through a microfluidiser etc or a combination thereof, to achieve uniformity of particle size.

After preparation of the catalyst ink, the ink is deposited onto a substrate (e.g. ion-conducting membrane or transfer substrate) to form the anode catalyst layer. The ink may be deposited by standard methods know to those skilled in the art. Such techniques include gravure coating, slot die (slot, extrusion) coating (whereby the coating is squeezed out under pressure via a slot onto the substrate), screen printing, rotary screen printing, inkjet printing, spraying, painting, bar coating, pad coating, gap coating techniques such as knife or doctor blade over roll (whereby the coating is applied to the substrate then passes through a split between the knife and a support roller), and metering rod application such as with a Meyer bar.

The catalyst layer is suitably $\geq 1$ µm; more suitably $\geq 2$ µm in thickness; preferably $\geq 5$ µm.

The catalyst layer is suitably $\leq 15$ µm; more suitably $\leq 10$ µm in thickness.

Cathode Catalyst Layer

The cathode catalyst layer is present on a second face of the ion-conducting membrane component.

The cathode catalyst layer comprises a second electrocatalyst component comprising a second platinum-containing electrocatalyst. The second platinum-containing electrocatalyst comprises platinum.

In one aspect of the invention, the second platinum-containing electrocatalyst consists of platinum.

In a second aspect, the platinum is alloyed or mixed with one or more other platinum group metals (ruthenium, rhodium, palladium, osmium or iridium), gold, silver or a base metal or an oxide of one or more other platinum group metals, gold, silver or a base metal. The platinum is optionally alloyed or mixed with one or more of nickel, cobalt, chromium, palladium, iridium, copper, iron or zinc. The alloyed metal containing electrocatalyst may take the form of nanoparticles in which the alloying components are uniformly distributed through the particle, or in which the surface is enriched in the platinum component, which may be commonly referred to as "core-shell" or "de-alloyed" electrocatalyst materials.

Suitably, the mean average particle size of the second platinum-containing electrocatalyst nanoparticles is $\geq 3$ nm, suitably $\geq 4$ nm as measured using a transmission electron microscope (TEM).

The second platinum-containing electrocatalyst is supported on a second carbon support. The second carbon support may have an agglomerated particulate structure, such as one or more carbonaceous materials selected from the group consisting of low surface area carbon blacks or, heat-treated carbon blacks.

The second carbon support shows high resistance to corrosion at high potentials. By this is meant that the second carbon support material loses 20% or less of its mass in an accelerated test involving a 1.2 V potential hold over a 24 hour period at 80° C. The loss of carbon can be determined as hereinbefore described with reference to the first carbon support.

The second carbon support suitably has a specific surface area (BET) of 100-600 m$^2$/g (suitably 300-500 m$^2$/g) and a micropore area of 10-90 m$^2$/g (suitably 10-60 m$^2$/g).

The specific surface area using the BET method may be determined as hereinbefore described.

The micropore area refers to the surface area associated with the micropores, where a micropore is defined as a pore of internal width less than 2 nm. The micropore area is determined by use of a t-plot, generated from the nitrogen adsorption isotherm generated from the BET surface area determination method described above. The t-plot has the volume of gas adsorbed plotted as a function of the standard multilayer thickness, t, wherein the t value are calculated using the pressure values from the adsorption isotherm in a thickness equation; in this case the Harkins-Jura equation. The slope of the linear portion of the t-plot thickness values between 0.35 and 0.5 nm is used to calculate the external surface area, that is, the surface area associated with all pores except the micropores. The micropore surface is then calculated by subtraction of the external surface area from the BET surface area. More details can be found in 'Analytical Methods in Fine Particle Technology', by Paul A. Webb and Clyde Orr, Micromeritics Instruments Corporation 1997.

The second carbon support material can be obtained by functionlisation of a pre-existing carbon material. Functionalisaton or activation of carbon has been described in the literature and is understood in the case of physical activation as a post-treatment of carbon with gases like oxygen or air, carbon dioxide, steam, ozone, or nitrogen oxide or in the case of chemical activation as a reaction of the carbon precursor with solid or liquid reagents like KOH, $ZnCl_2$ or $H_3PO_4$ at elevated temperatures. Examples of such functionlisation or activation are described by H. Marsch and. F. Rodriquez-Reinoso in 'Activated Carbon', Elsevier Chapter 5 (2006). During the activation process parts of the carbon is lost by the chemical reaction of burn-off. Specific examples of material suitable for use as the second carbon support include those disclosed in WO2013/045894.

Nanoparticles of the second platinum-containing electrocatalyst are supported on the second carbon support in an amount of from 30-70 wt %, suitably 40-60 wt %, preferably 45-55 wt % based on the total weight of the second electrocatalyst component (second platinum-containing electrocatalyst and second carbon support).

The cathode catalyst layer optionally comprises a second oxygen evolution reaction electrocatalyst as described in more detail hereinafter. Suitably, the ratio (by weight) of the second oxygen evolution electrocatalyst to second electrocatalyst component (second platinum-containing electrocatalyst+second carbon support) in the cathode catalyst layer is from 0.1:1 to 0.5:1, suitably 0.125:1 to 0.4:1.

The cathode catalyst layer suitably comprises an ion-conducting polymer, suitably a proton-conducting polymer. The proton-conducting polymer is any polymer that is capable of conducting protons. Examples of such polymers include dispersions of polymers based on perfluorosulphonic acid (PFSA) polymers (such as those sold under the trade names Nafion® (E.I. DuPont de Nemours and Co.), Aquivion® (Solvay Plastics), Aciplex® (Asahi Kasei) and Flemion® (Asahi Glass KK). Such PFSA based ion-conducting polymers are formed from the copolymerization of tetrafluoroethylene and a perfluorinated sulphonic acid derivative.

As an alternative to PFSA ion-conducting polymers it is possible to use dispersions of ion-conducting polymers based on sulphonated or phosphonated hydrocarbon polymers, such as the polyaromatic class of polymers.

The cathode catalyst layer optionally comprises a second hydrogen peroxide decomposition catalyst as described in more detail hereinafter.

The cathode catalyst layer may comprise additional components. Such components include, but are not limited to: a hydrophobic (a polymer such as PTFE or an inorganic solid with or without surface treatment) or a hydrophilic (a polymer or an inorganic solid, such as an oxide) additive to control water transport.

To prepare the cathode catalyst layer the second electrocatalyst component, optional second oxygen evolution reaction electrocatalyst and optional second hydrogen peroxide decomposition catalyst, and any additional components, are dispersed in an aqueous and/or organic solvent, to prepare a catalyst ink. If required, particle break-up is carried out by methods known in the art, such as high shear mixing, milling, ball milling, passing through a microfluidiser etc or a combination thereof, to achieve uniformity of particle size.

After preparation of the catalyst ink, the ink is deposited onto a substrate (e.g. ion-conducting membrane, or transfer substrate) to form the cathode catalyst layer. The ink may be deposited by standard methods such as printing, spraying, knife over roll, powder coating, electrophoresis etc.

The catalyst layer is suitably ≥2 μm; more suitably ≥5 μm in thickness.

The catalyst layer is suitably ≤20 μm; more suitably ≤15 μm in thickness.

The loading of platinum in the catalyst layer is ≤0.4 mg/cm².

The loading of platinum in the catalyst layer is ≥0.05 mg/cm².

Ion-Conducting Membrane

The ion-conducting membrane component comprises an ion-conducting membrane. The ion-conducting membrane may be any membrane suitable for use in a PEMFC, for example the membrane may be based on a perfluorinated sulphonic acid material such as Nafion® (DuPont), Aquivion® (Solvay-Plastics), Flemion® (Asahi Glass) and Aciplex® (Asahi Kasei). Alternatively, the membrane may be based on a sulphonated hydrocarbon membrane such as those available from FuMA-Tech GmbH as the fumapem® P, E or K series of products, JSR Corporation, Toyobo Corporation, and others. Alternatively, the membrane may be based on polybenzimidazole doped with phosphoric acid which will operate in the range 120° C. to 180° C.

The ion-conducting membrane component may contain a reinforcement, such as a planar porous material (for example expanded polytetrafluoroethylene as described in USRE37307), embedded within the thickness of the membrane, to provide for improved mechanical strength of the membrane, such as increased tear resistance and reduced dimensional change on hydration and dehydration, and thus increase durability of the MEA and lifetime of the fuel cell. Other approaches for forming reinforced membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer.

The ion-conducting membrane component optionally comprises a third hydrogen peroxide decomposition catalyst as described in more detail hereinafter.

The third hydrogen peroxide decomposition catalyst may be present as a layer on one or both faces of the ion-conducting membrane.

Alternatively, the third hydrogen peroxide decomposition catalyst may be dispersed throughout the ion-conducting. The dispersion may be uniform or non-uniform.

The ion-conducting membrane component may optionally comprise a recombination catalyst, in particular a catalyst for the recombination of $H_2$ and $O_2$ crossed over from the anode and cathode respectively and produce water. Suitable recombination catalysts comprise a metal (such as platinum) on a high surface area oxide support material (such as silica, titania, zirconia). More examples of recombination catalysts are disclosed in EP0631337 and WO00/24074.

First and Second Oxygen Evolution Reaction Electrocatalyst

If present, the first and second oxygen evolution reaction electrocatalyst may be the same or different.

The first and/or second oxygen evolution reaction electrocatalyst may comprise ruthenium or ruthenium oxide or iridium or iridium oxide or mixtures thereof.

The first and/or second oxygen evolution reaction electrocatalyst may comprise iridium or iridium oxide and one or more metals M or an oxide thereof. M is a transition metal (other than iridium or ruthenium) or tin.

M may be a Group 4 metal: titanium, zirconium or hafnium.

M may be a Group 5 metal: vanadium, niobium or tantalum

M may be a Group 6 metal: chromium, molybdenum or tungsten.

M may be tin.

M may be selected from the group consisting of tantalum, titanium, zirconium, hafnium, niobium and tin; preferably tantalum, titanium and tin; most preferably tantalum.

The iridium or oxide thereof and the one or more metals (M) or oxide thereof may either exist as mixed metals or oxides or as partly or wholly alloyed materials or as a combination thereof. The extent of any alloying can be shown by x-ray diffraction (XRD).

The atomic ratio of iridium to (total) metal M in the second oxygen evolution electrocatalyst is from 20:80 to 99:1, suitably 30:70 to 99:1 and preferably 60:40 to 99:1.

Such first and/or second oxygen evolution electrocatalysts may be made by methods known to those in the art, for example by wet chemical methods.

Alternatively, the first and/or second oxygen evolution reaction electrocatalyst may comprise a crystalline mixed metal oxide.

Examples of suitably mixed metal oxide are those of formula

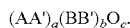

$(AA')_a(BB')_bO_c$.

wherein A and A' are the same or different and are selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony and bismuth; B is selected from the group consisting of Ru, Ir, Os, and Rh; B' is selected from the group consisting of Ru, Ir, Os, Rh, Ca, Mg or RE (wherein RE is a rare earth metal); c is from 3-11; the atomic ratio of (a+b):c is from 1:1 to 1:2; the atomic ratio of a:b is from 1:1.5 to 1.5:1. These crystalline mixed metal oxides may be prepared by methods known in the art, such as described in WO2012/080726, which is incorporated herein by reference.

The first and/or second oxygen evolution electrocatalyst may be unsupported. Alternatively, the first and/or second oxygen evolution electrocatalyst may be supported on one or more carbonaceous materials selected from the group consisting of graphite, nanofibres, nanotubes, nanographene platelets and low surface area, heat-treated carbon blacks, or non-carbonaceous support.

First, Second and Third Hydrogen Peroxide Decomposition Catalyst

If present, the first, second and third hydrogen peroxide decomposition catalysts suitable for use are known to those skilled in the art and may independently be selected from the group consisting of metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The catalysed membrane of the invention is assembled by applying the anode catalyst layer to a first face of the ion-conducting membrane component and cathode catalyst layer to the second face of the ion-conducting membrane component to produce the catalysed membrane. There are many processes involving various sequences of operations by which the catalyst layers and membrane are brought together to form the catalysed membrane, that are well-known to those skilled in the art.

It will be appreciated by the skilled person that methods could be applied to the manufacture of single or individual catalysed membranes or could be applied to the manufacture of a continuous roll of catalysed membrane.

The invention further provides a membrane electrode assembly comprising:
(i) an ion-conducting membrane component having a first face and a second face, wherein the ion-conducting membrane component comprises an ion-conducting membrane;
(ii) an anode catalyst layer on the first face of the ion-conducting membrane component, wherein the anode catalyst layer comprises:
  (a) a first electrocatalyst component comprising a first platinum-containing electrocatalyst and a first carbon support, wherein the first carbon support supports the first platinum-containing electrocatalyst;
  and wherein the electrochemical platinum surface area in the anode catalyst layer is 5-100 $cm^2Pt/cm^2$ of the geometric electrode area of the anode catalyst layer;
(iii) a cathode catalyst layer on the second face of the ion-conducting membrane component, wherein the cathode catalyst layer comprises:
  (a) a second electrocatalyst component comprising a second platinum-containing electrocatalyst and a second carbon support, wherein the second carbon support supports the second platinum-containing electrocatalyst component;
(iv) an anode gas diffusion layer on a face of the anode catalyst layer not in contact with the first face of the ion-conducting membrane; and
(v) a cathode gas diffusion layer on a face of the cathode catalyst layer not in contact with the second face of the ion-conducting membrane.

The ion-conducting component, anode catalyst layer and cathode catalyst layer are as hereinbefore described for the catalysed membrane of the invention.

Gas Diffusion Layers

The anode and cathode gas diffusion layers may be the same or different.

The gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE). The gas diffusion layers are attached by conventional techniques.

The membrane electrode assembly may further comprise polymeric components that act as seals and/or reinforcement for the edge regions of the membrane electrode assembly, for example as disclosed in WO2005/020356. The seal components can be incorporated at any stage of the membrane electrode assembly fabrication process, depending on whether they are required to be positioned between the ion-conducting membrane component and the catalyst layer or between the catalyst layer and the gas diffusion layer.

The membrane electrode assembly of the invention is assembled by one of two basic approaches.

In a first method, the anode catalyst layer is applied to a first face of the ion-conducting membrane component and cathode catalyst layer is applied to the second face of the ion-conducting membrane component to produce a catalysed membrane. Anode and cathode gas diffusion layers are then attached either side of the anode and cathode catalyst layers respectively to form the complete membrane electrode assembly. There are many processes involving various sequences of operations by which the catalyst layers and membrane are brought together to form the catalysed membrane, that are well-known to those skilled in the art.

In a second method, the anode catalyst layer is applied to the anode gas diffusion layer and the cathode catalyst layer is applied to the cathode gas diffusion layer. The ion-conducting membrane is then located between the anode and cathode catalyst layers and the integrated MEA assembled. Again there are many processes involving various sequences of operations by which the integrated complete MEA may be produced.

Alternatively, a combination of the first and second method may be used, wherein one of the anode catalyst layer and the cathode catalyst layer is applied to a gas diffusion layer and the other to one face of the ion-conducting membrane. The uncatalysed face of the ion-conducting membrane is brought together with the catalyst layer on the gas diffusion layer; a second gas diffusion layer is applied to the other catalyst layer on the ion-conducting membrane.

The catalysed membrane and membrane electrode assembly of the invention has utility in an electrochemical cell, such as a fuel cell, requiring a catalysed membrane or membrane electrode assembly. Thus, a further aspect provides the use of a catalysed membrane of the invention in an electrochemical cell, such as a fuel cell.

Although the invention is described with reference to its use in a fuel cell, it can be understood that the membrane electrode assembly of the invention will have application and may be used in other electrochemical devices, such as a regenerative fuel cell or an electrolyser.

The invention will be described further with reference to the following examples which are illustrative and not limiting of the invention.

Preparation of Electrocatalyst Inks

Anode and cathode electrocatalyst inks were prepared by methods known to those skilled in the art. Briefly, the catalyst material (including the oxygen evolution reaction catalyst, if used) was added to an aqueous dispersion of 1100 EW Nafion® (from DuPont de Nemours) with stirring to provide a dispersion with the required wt % of ionomer solids relative to the weight of carbon support (indicated in Table 1 below). This dispersion was mixed using a shear mixer to ensure the components were evenly dispersed before processing through a bead mill, to reduce the particle size of the electrocatalyst and produce the ink.

Preparation of MEAs

Catalyst layers were prepared by deposition of the anode and cathode catalyst inks each onto a PTFE decal-transfer substrate and drying to achieve a catalyst layer with loadings as indicated in Table 1. The anode and cathode catalyst layer decals were positioned on either side of an expanded polytetrafluoroethylene-reinforced 17 μm 900 EW perfluorosulphonic acid membrane (made from Flemion™ FSS-2 ionotner from Asahi Glass) and hot pressed to produce a CCM. Appropriate seals and GDLs were added to allow compatibility with the fuel cell single cell hardware. MEAs were prepared with the cathode and anode electrocatalyst layers as shown in Table 1.

EPSA Measurement and Start-Up/Shut-Down Durability Testing

The MEA was assembled into the single fuel cell and was initially conditioned at 70° C. using standard current density-hold methods and beginning-of-life polarization data was obtained. The load was then removed such that the cell moves to open circuit voltage.

For the EPSA measurement, hydrogen was flowed on the cathode side of the MEA and nitrogen on the anode. Once the anode side was fully purged of any residual hydrogen the flow was switched to 10% v/v CO in nitrogen for 10 minutes, before switching back to pure nitrogen for a further 10 minutes. With hydrogen still flowing on the cathode side, 3 voltammetry cycles were performed between 0.125-0.8 V at 20 mV/sec. The charge under the CO stripping peak recorded on the first cycle, relative to the stable baseline from the $2^{nd}/3^{rd}$ cycle was then integrated to provide a measurement of the platinum surface area using a conversion factor of 420 μC/cm². The surface area measurement was then normalized to the geometric area of the anode electrode to provide the EPSA value. EPSA measured values are provided in Table 1.

The cell was returned to conventional operation with hydrogen fed to the anode and air to the cathode. For the start-up/shut-down (SU/SD) durability testing, the anode gas feed was switched from hydrogen to synthetic air (79:21 $N_2:O_2$) and so any $CO_2$ subsequently monitored is solely derived from carbon corrosion without the background level of 'standard air'; the cathode was also switched to synthetic air. The anode air flow was maintained for 4 minutes before returning the MEA to normal $H_2$/air conditions with the immediate re-introduction of load. The cell voltage (performance) was monitored at medium and a high current density points and the start-up/shut down (SU/SD) cycle repeated. After each set of 10 SU/SD cycles, the MEA was reconditioned under 100% relative humidity, 1 A/cm² conditions to ensure adequate hydration of the MEA. The process was

TABLE 1

|  | Example 1 | Example 2 | Example 3 | Comparative Example 1 |
|---|---|---|---|---|
| Anode catalyst | HiSPEC 9100[1] | 60 wt % Pt/graphitised Ketjen[2] | HiSPEC 9100[1] | HiSPEC 9100[1] |
| Nafion ® loading in anode (%) | 150 | 100 | 150 | 120 |
| Nominal Anode loading (mgPt/cm²) | 0.1 | 0.2 | 0.1 | 0.4 |
| EPSA (cm²Pt/cm² anode geometric area) | 73 | 51 | 73 | 225 |
| Cathode catalyst | 60 wt % Pt/graphitised Ketjen[2] | 60 wt % Pt/graphitised Ketjen[2] | 60 wt % Pt/graphitised Ketjen[2] | 60 wt % Pt/graphitised Ketjen[2] |
| Nafion ® loading in cathode (%) | 100 | 100 | 100 | 100 |
| Nominal Cathode loading (mgPt/cm²) | 0.4 | 0.4 | 0.4 | 0.4 |
| Cathode oxygen evolution catalyst | N/A | N/A | IrTaO$_x$[3] | N/A |
| Cathode oxygen evolution catalyst loading (mg/cm²) | N/A | N/A | 0.235 | N/A |

[1]Available from Johnson Matthey Fuel Cells Limited (Pt surface area of 85 m²/g).
[2]60 wt % Pt on graphitised Ketjen EC 300J. This material can be prepared by standard methods known to those skilled in the art (for example using the General Method of Preparation described in WO2013/045894.
[3]Prepared as described in WO2011/021034 continually repeated until a significant voltage loss from the MEA was observed and the number of cycles noted.

The results are shown in FIG. 1. It can be seen that the Examples of the invention having a low EPSA at the anode results in an MEA which can tolerate a significantly increased number of SU/SD cycles before significant cell voltage (performance) loss occurs when compared to the Comparative Example 1 having a conventional EPSA at the anode.

The invention claimed is:

1. A catalysed membrane comprising:
(i) an ion-conducting membrane component having a first face and a second face, wherein the ion-conducting membrane component comprises an ion-conducting membrane;
(ii) an anode catalyst layer on the first face of the ion-conducting membrane component, wherein the anode catalyst layer comprises:
  (a) a first electrocatalyst component comprising a first platinum-containing electrocatalyst and a first carbon support, wherein the first carbon support supports the first platinum-containing electrocatalyst; and
  wherein the electrochemical platinum surface area in the anode catalyst layer is 5-100 $cm^2Pt/cm^2$ of the geometric electrode area of the anode catalyst layer; and,
(iii) a cathode catalyst layer on the second face of the ion-conducting membrane component, wherein the cathode catalyst layer comprises:
  (a) a second electrocatalyst component comprising a second platinum-containing electrocatalyst and a second carbon support, wherein the second carbon support supports the second platinum-containing electrocatalyst component; and,
  (b) an oxygen evolution reaction electrocatalyst.

2. The catalysed membrane according to claim 1, wherein the anode catalyst layer comprises a first oxygen evolution reaction electrocatalyst.

3. The catalysed membrane according to claim 1, wherein the anode catalyst layer comprises a first hydrogen peroxide decomposition catalyst.

4. The catalysed membrane according to claim 1, wherein the cathode catalyst layer comprises a hydrogen peroxide decomposition catalyst.

5. The catalysed membrane according to claim 1, wherein the ion-conducting membrane component comprises a hydrogen peroxide decomposition catalyst.

6. The catalysed membrane according to claim 1, wherein the ion-conducting membrane component comprises a hydrogen/oxygen recombination catalyst.

7. A membrane electrode assembly comprising:
(i) an ion-conducting membrane component having a first face and a second face, wherein the ion-conducting membrane component comprises an ion-conducting membrane;
(ii) an anode catalyst layer on the first face of the ion-conducting membrane component, wherein the anode catalyst layer comprises:
  (a) a first electrocatalyst component comprising a first platinum-containing electrocatalyst and a first carbon support, wherein the first carbon support supports the first platinum-containing electrocatalyst; and
  wherein the electrochemical platinum surface area in the anode catalyst layer is 5-100 $cm^2Pt/cm^2$ of the geometric electrode area of the anode catalyst layer; and,
(iii) a cathode catalyst layer on the second face of the ion-conducting membrane component, wherein the cathode catalyst layer comprises:
  (a) a second electrocatalyst component comprising a second platinum-containing electrocatalyst and a second carbon support, wherein the second carbon support supports the second platinum-containing electrocatalyst component;
  (b) a oxygen evolution reaction electrocatalyst;
(iv) an anode gas diffusion layer on a face of the anode catalyst layer not in contact with the first face of the ion-conducting membrane; and
(v) a cathode gas diffusion layer on a face of the cathode catalyst layer not in contact with the second face of the ion-conducting membrane.

8. The catalysed membrane according to claim 1, wherein the oxygen evolution reaction electrocatalyst comprises ruthenium or ruthenium oxide or iridium or iridium oxide or mixtures thereof or the oxygen evolution reaction electrocatalyst comprises a crystalline mixed metal oxide of formula $(AA')_a(BB')_bO_c$ wherein A and A' are the same or different and are selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony, and bismuth; B is selected from the group consisting of Ru, Ir, Os, and Rh; B' is selected from the group consisting of Ru, Ir, Os, Rh, Ca, Mg, and a rare earth metal; c is from 3-11; the atomic ratio of (a+b):c is from 1:1 to 1:2; the atomic ratio of a:b is from 1:1.5 to 1.5:1.

9. The membrane electrode assembly according to claim 7, wherein the oxygen evolution reaction electrocatalyst comprises ruthenium or ruthenium oxide or iridium or iridium oxide or mixtures thereof or the oxygen evolution reaction electrocatalyst comprises a crystalline mixed metal oxide of formula $(AA')_a(BB')_bO_c$ wherein A and A' are the same or different and are selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony, and bismuth; B is selected from the group consisting of Ru, Ir, Os, and Rh; B' is selected from the group consisting of Ru, Ir, Os, Rh, Ca, Mg, and a rare earth metal; c is from 3-11; the atomic ratio of (a+b):c is from 1:1 to 1:2; the atomic ratio of a:b is from 1:1.5 to 1.5:1.

* * * * *